(12) United States Patent
Shapira et al.

(10) Patent No.: US 11,977,653 B2
(45) Date of Patent: May 7, 2024

(54) SYSTEMS AND METHODS FOR SECURING FILES AND/OR RECORDS RELATED TO A BUSINESS PROCESS

(71) Applicant: RECOLABS LTD., Tel Aviv (IL)

(72) Inventors: Tal Shapira, Tel Aviv (IL); Eyal Asulin, Tel Aviv (IL); Dorin Shmaryahu, Barkan (IL); Gilad Wisney, Tel Aviv (IL); Gal Bezalel, Shoham (IL); Nir Weingarten, Tel Aviv (IL)

(73) Assignee: RECOLABS LTD., Tel Aviv (IL)

( * ) Notice: Subject to any disclaimer, the term of this patent is extended or adjusted under 35 U.S.C. 154(b) by 0 days.

(21) Appl. No.: 17/687,757

(22) Filed: Mar. 7, 2022

(65) Prior Publication Data
US 2023/0281328 A1    Sep. 7, 2023

(51) Int. Cl.
*G06F 21/31* (2013.01)
*G06F 21/60* (2013.01)
(Continued)

(52) U.S. Cl.
CPC .......... *G06F 21/6218* (2013.01); *G06F 21/31* (2013.01); *G06F 21/604* (2013.01); *G06F 21/78* (2013.01)

(58) Field of Classification Search
CPC .... G06F 21/6218; G06F 21/31; G06F 21/604; G06F 21/78
(Continued)

(56) References Cited

U.S. PATENT DOCUMENTS

| 8,595,844 B2 * | 11/2013 | Bahl ....................... H04L 41/28 |
| | | 713/165 |
| 10,664,538 B1 * | 5/2020 | Pallemulle .......... G06F 16/9038 |

(Continued)

FOREIGN PATENT DOCUMENTS

| CN | 101923669 A | * 12/2010 |
| CN | 105592034 A | * 5/2016 |

(Continued)

OTHER PUBLICATIONS

Leonardi, Simone, Diego Monti, Giuseppe Rizzo, and Maurizio Morisio. "Mining micro-influencers from social media posts." In Proceedings of the 35th Annual ACM Symposium on Applied Computing, pp. 867-874. 2020. (Year: 2020).*
(Continued)

*Primary Examiner* — Luu T Pham
*Assistant Examiner* — Walter J Malinowski
(74) *Attorney, Agent, or Firm* — AlphaPatent Associates Ltd.; Daniel J. Swirsky

(57) ABSTRACT

A computer implemented method for securing at least one of files and records related to a specific process, the method comprising obtaining interaction data comprising one or more persons and one or more files and/or records, said interaction data comprises a process interaction score between at least one user and the specific process; identifying, from the interaction data, one or more persons and one or more files and/or records related to the specific process; comparing a process threshold with a process interaction score between a target user and the specific process; and in response to the comparison satisfying a rule, performing a security operation on the one or more files and/or records related to the specific process.

13 Claims, 5 Drawing Sheets

(51) Int. Cl.
  *G06F 21/62* (2013.01)
  *G06F 21/78* (2013.01)
(58) Field of Classification Search
  USPC .......................................................... 726/26
  See application file for complete search history.

(56) References Cited

U.S. PATENT DOCUMENTS

| | | | | |
|---|---|---|---|---|
| 11,310,282 | B1* | 4/2022 | Zhang | H04L 43/045 |
| 2007/0043608 | A1* | 2/2007 | May | G06Q 10/10 |
| | | | | 705/7.29 |
| 2007/0136813 | A1* | 6/2007 | Wong | H04L 63/1416 |
| | | | | 726/25 |
| 2008/0086759 | A1* | 4/2008 | Colson | G06F 21/40 |
| | | | | 713/182 |
| 2011/0087679 | A1* | 4/2011 | Rosato | G06F 16/954 |
| | | | | 707/E17.005 |
| 2011/0173190 | A1* | 7/2011 | van Zwol | G06F 16/58 |
| | | | | 707/723 |
| 2013/0239168 | A1* | 9/2013 | Sreenivas | G06F 21/57 |
| | | | | 726/1 |
| 2013/0339018 | A1* | 12/2013 | Scheffer | H04L 63/10 |
| | | | | 704/E15.001 |
| 2014/0123025 | A1* | 5/2014 | Bau | H04L 51/04 |
| | | | | 715/752 |
| 2015/0381631 | A1* | 12/2015 | Salem | H04L 63/102 |
| | | | | 726/4 |
| 2016/0078247 | A1* | 3/2016 | Tucker | G06F 21/602 |
| | | | | 726/1 |
| 2016/0098405 | A1* | 4/2016 | Gorbansky | G06F 16/93 |
| | | | | 707/749 |
| 2016/0248795 | A1* | 8/2016 | Chien | H04L 63/0227 |
| 2016/0328627 | A1* | 11/2016 | Fujii | H04M 11/00 |
| 2017/0269791 | A1* | 9/2017 | Meyerzon | G06Q 10/101 |
| 2017/0364355 | A1* | 12/2017 | Nitschke | G06F 8/77 |
| 2018/0027006 | A1* | 1/2018 | Zimmermann | G06F 21/6218 |
| | | | | 726/11 |
| 2018/0123815 | A1* | 5/2018 | Milvaney | H04L 12/1827 |
| 2018/0139227 | A1* | 5/2018 | Martin | H04L 63/1433 |
| 2018/0152471 | A1* | 5/2018 | Jakobsson | G06Q 50/01 |
| 2018/0181928 | A1* | 6/2018 | Woo | G06Q 20/223 |
| 2018/0248902 | A1* | 8/2018 | Dănilă-Dumitrescu | ............... H04L 67/535 |
| 2019/0050406 | A1* | 2/2019 | Nguyen | G06F 16/248 |
| 2019/0122149 | A1* | 4/2019 | Caldera | H04L 63/102 |
| 2019/0179938 | A1* | 6/2019 | Feuz | G06N 3/08 |
| 2019/0272482 | A1* | 9/2019 | Patil | G06F 16/355 |
| 2020/0036547 | A1* | 1/2020 | Heins | G06F 16/438 |
| 2020/0153776 | A1* | 5/2020 | Qiu | H04L 51/226 |
| 2020/0211031 | A1* | 7/2020 | Patil | G06Q 20/14 |
| 2020/0236086 | A1* | 7/2020 | Patil | G06F 9/45558 |
| 2020/0272283 | A1* | 8/2020 | Sarin | G06N 3/08 |
| 2020/0302074 | A1* | 9/2020 | Little | G06F 21/6218 |
| 2021/0012910 | A1* | 1/2021 | Hussain | G16H 40/20 |
| 2021/0097191 | A1* | 4/2021 | Howell | G06K 9/6215 |
| 2021/0152585 | A1* | 5/2021 | Karni | G06F 21/554 |
| 2021/0182761 | A1* | 6/2021 | Ben Eliezer | G06N 3/0454 |
| 2021/0201175 | A1* | 7/2021 | Ou | G06N 20/00 |
| 2021/0241756 | A1* | 8/2021 | DeLuca | G06F 3/167 |
| 2021/0326366 | A1* | 10/2021 | Chandrahasan | G06F 16/38 |
| 2022/0014543 | A1* | 1/2022 | Jakobsson | H04L 63/1425 |
| 2022/0101676 | A1* | 3/2022 | Kerzner | G07C 9/37 |
| 2022/0131844 | A1* | 4/2022 | Sherlock | H04L 63/1433 |
| 2022/0188445 | A1* | 6/2022 | Orazio | G06F 21/6218 |
| 2022/0400026 | A1* | 12/2022 | Guggari | G06Q 10/1093 |
| 2023/0205905 | A1* | 6/2023 | Paul | G06F 21/6209 |
| | | | | 726/26 |

FOREIGN PATENT DOCUMENTS

| | | | | |
|---|---|---|---|---|
| CN | 110189092 | A | * | 8/2019 |
| CN | 110619506 | A | * | 12/2019 |
| CN | 111178949 | A | * | 5/2020 |
| CN | 112468884 | A | * | 3/2021 |
| CN | 112684889 | A | * | 4/2021 |
| CN | 114448872 | A | * | 5/2022 |
| CN | 116861287 | A | * | 10/2023 |
| EP | 3422236 | A1 | * | 1/2019 ........... G06F 21/335 |
| JP | 4246548 | B2 | * | 4/2009 |
| KR | 20050061975 | A | * | 6/2005 |
| WO | WO-2010099632 | A1 | * | 9/2010 ............. G06Q 30/02 |

OTHER PUBLICATIONS

Zeng, Yi-Chong. "Automatic extraction of useful scenario information for dramatic videos." In 2013 9th International Conference on Information, Communications & Signal Processing, pp. 1-5. IEEE, 2013. (Year: 2013).*

Krishnan. "A blockchain-based credibility scoring framework for electronic medical records." In 2020 IEEE Globecom Workshops (GC Wkshps, pp. 1-6. IEEE, 2020. (Year: 2020).*

Tao, Ye, Shuaitong Guo, Cao Shi, and Dianhui Chu. "User behavior analysis by cross-domain log data fusion." IEEE Access 8 (2019): 400-406. (Year: 2019).*

Feeney, Kevin, Karl Quinn, David Lewis, Declan O'Sullivan, and Vincent Wade. "Relationship-driven policy engineering for autonomic organisations." In Sixth IEEE International Workshop on Policies for Distributed Systems and Networks (Policy'05), pp. 89-98. IEEE, 2005. (Year: 2005).*

Al-Baik, Osama, and James Miller. "Integrative double kaizen loop (IDKL): towards a culture of continuous learning and sustainable improvements for software organizations." IEEE transactions on Software Engineering 45, No. 12 (2018): 1189-1210. (Year: 2018).*

Tharatipyakul, Atima, and Suporn Pongnumkul. "User interface of blockchain-based agri-food traceability applications: A review." IEEE Access 9 (2021): 82909-82929. (Year: 2021).*

* cited by examiner

SYSTEMS AND METHODS FOR SECURING FILES AND/OR RECORDS RELATED TO A BUSINESS PROCESS

FIELD AND BACKGROUND

The invention, in some embodiments thereof, relates to access control and, more specifically, but not exclusively, to systems and methods for securing files and/or records.

Traditional approaches for securing files and/or records include user set passwords, a user providing links to other users for accessing the file, and an administrative setting permission levels for users.

SUMMARY

In one aspect of the invention a computer implemented method is provided for securing at least one of files and records related to a specific process, the method including obtaining interaction data including one or more persons and one or more files and/or records, said interaction data including a process interaction score between at least one user and the specific process, identifying, from the interaction data, one or more persons and one or more files and/or records related to the specific process, comparing a process threshold with a process interaction score between a target user and the specific process, and in response to the comparison satisfying a rule, performing a security operation on the one or more files and/or records related to the specific process.

In some cases, the process interaction score between the target user and the specific process is computed as a function of at least one of (i) interaction events between the target user and at least one other user, said interaction events are identified as related to the specific process, and (ii) interaction events between the target user and one or more files and/or records, said interaction events are identified as related to the specific process.

In some cases, the method further includes monitoring an attempt by the target user to access one or more files and/or records related to the specific process. In some cases, the method further includes updating the interaction data with new interactions. In some cases, the method further includes computing a risk level score according to a difference between the process interaction score and the process threshold. In some cases, the method further includes collecting a plurality of interaction events between entities known as related to the specific process, computing the interaction data according to an analysis of the plurality of interaction events.

In some cases, collecting the plurality of interaction events is performed using at least one of a group including a code sensor, an application programming interfaces (APIs) and a virtual interface, installed on a device operated by the users.

In some cases, the interaction events are associated with an interaction contribution date, wherein a weight at least some of the interaction events decreases over time. In some cases, the plurality of interaction events is selected from a group consisting of participating in an online meeting, organizing the online meeting, accessing a calendar event, sending email messages, receiving email messages, reading a file, sharing a file, creating a file, editing a file, accessing a record, reading a record, sharing a record, creating a record, and editing a record. In some cases, the security operation includes changing permission definitions for the target user. In some cases, the security operation includes delaying access from the target user to at least one of the one or more files and/or records identified as related to the specific process. In some cases, the security operation includes filtering an alert.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings

DETAILED DESCRIPTION

Figure 1:
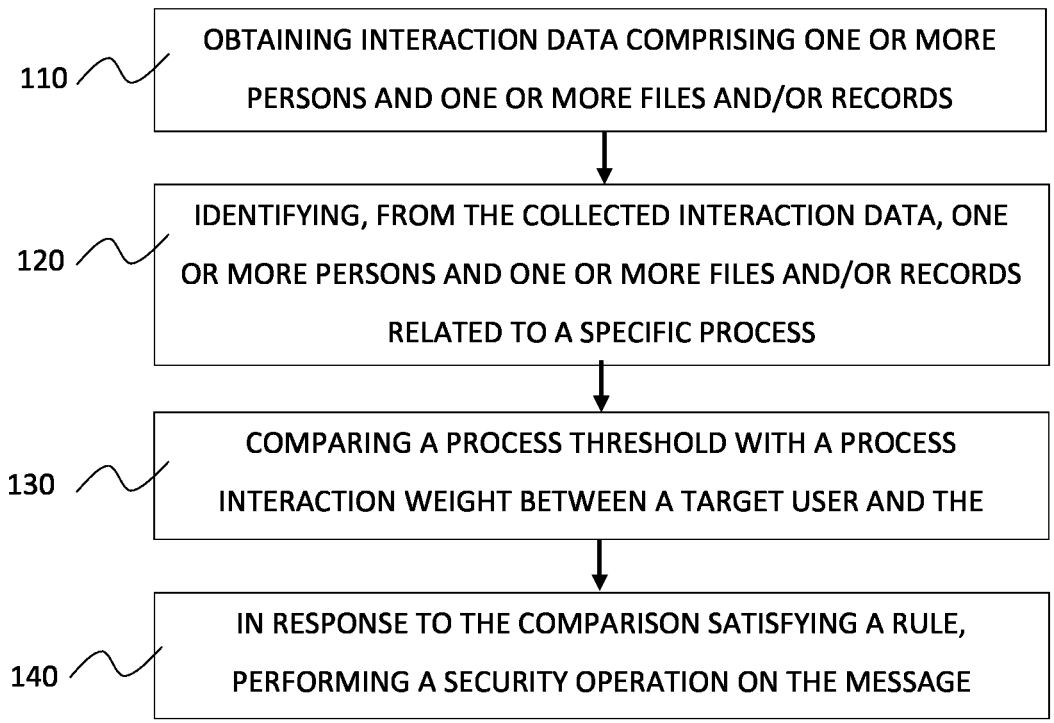
FIG. 1 is a flowchart of a method of securing files and/or records according relevance to a specific process, in accordance with some embodiments of the invention.

The invention, in some embodiments thereof, relates to access control and, more specifically, but not exclusively, to systems and methods for controlling user access to files.

An aspect of some embodiments of the invention relates to systems, methods, an apparatus, and/or code instructions (e.g., stored on a memory and executable by one or more hardware processors) for securing files and/or records from access by a target user. The instructions include obtaining interaction data including one or more persons and one or more files and/or records, identifying, from the interaction data, one or more persons and one or more files and/or records related to the specific process, comparing a process threshold with a process interaction score between a target user and the specific process, and in response to the comparison satisfying a rule, performing a security operation on the one or more files and/or records related to the specific process.

At least some implementations described herein address the technical problem of securing files and/or records, for example, controlling user access to files, folders or directories that store files or to software applications that contain files or links to files, such as Instant messaging applications such as Teams, Slack, email applications and the like. At least some implementations described herein address the technology of automated securing of files and/or records, for example, automated control of user access to files. On the one hand, granting users security clearance (e.g., full access) to files promotes team work on the files, for example, including other users which are not part of an organization. Different users may collaborate together on the file. On the other hand, lowering securing (e.g., enabling unrestricted access) to the files and/or records opens the door for malicious activity, such as unauthorized distribution of the file, stealing of intellectual property and other organization secrets, and/or opening a door for attacks on data. At least some implementations described herein address the technical problem, and/or improve the technology, by dynamically assigning security operations on files and records based on the specific business process the files are related to. The access of the target user to a specific file or record is dynamically determined based on current interactions patterns, which may indicate, for example, whether the user requires access to the file, such as a score indicating a level or relevance between the target user and the specific process. Unauthorized access to the file may be blocked, for example, when the user distributes a file to a friend which is not part of the organization, access by the friend to the file is blocked.

The technical problem and/or technology of securing files and/or records, for which at least some embodiments described herein provide a solution and/or improvement to the technology, optionally automatically, may related to one of more of Security—Alert decluttering—for example, data leakage prevention (DLP)). For each incident, the context (e.g., business context) of the action (for example file access/download) may be determined (e.g., interpretability) as described herein and/or the access may be determined to be legitimate or not as described herein. The number of false alerts may be significantly reduced using at least some implementations described herein.

Security—reduce risk by identifying a unique kind of alert—actions without any context (e.g., business context) may be found as described herein, and therefore malicious actions by an insider or other malicious activity may be identified. These actions may be identified using available anomaly detection approaches.

Security—IR (Incident Respond)—upon a security event, related actions and/or context (e.g., business context) may be provided as described herein to significantly reduce the TTR (time to respond).

Information technology (IT)—Access request (authorization management)—upon a user's request to get access to a file or record, whether the user has business justification may be determined as described herein, the context to approve may be provided to IT (e.g., to an administrator).

IT—least privilege access—when a user no longer has business justification for the access may be determined as described herein, and IT may be provided the context to remove permissions.

Other—information retrieval—for any user who wishes to find other business interactions which are related to the specific action.

At least some implementations described herein address the technical problem of processing interaction events between users and other users, and/or between users and files, in order to determine whether a specific user is to be granted access to, or blocked from, accessing a specific file. At least some implementations described herein address the technical problem, and/or improve the technology, by an unsupervised, and/or self-supervised approach in which the files and persons are identified as related to a specific process or not related to a specific process. When a file is determined as related to a specific process, security operations are applied on the file, for example changing permissions to the file based on the specific process. In case a target user wishes to perform an action on a file identified as related to a specific process, and the target user is not related to the specific process, the target user will be denied from performing the action.

At least some implementations described herein address the technical problem of interpretability of an automated security process that secures access to files and/or records, for example, automatically controls access (i.e., grants and/or blocks) to specific files and/or records by specific users. At least some implementations described herein improve the technology of automated security of files and/or records, for example, automated control of access to specific files by specific users. At least some implementations described herein address the technical problem, and/or improve the technology, by providing the basis for the security, for example, for an access control decision. The security may be determined (e.g., access control decision may be made) based on a likelihood that the requesting user is related to the same business process that the file is related to. The interpretability of the security (e.g., decision) may be based on providing the basis for the computation of the relevance of a person or file to a specific process used to determine the security (e.g., access), based on interaction events associated with anchors related to the specific process. The interpretability of the security (e.g., decision) may be used, for example, by an administrator evaluating blocked file accesses, to determine whether the target user is performing malicious activity on the files, such as copying, sending the files, accessing data stored in the files etc.

With the increased number of incidents that concerned data/assets access and the transition to software as a service (SaaS) Apps, it is difficult or even impossible to understand the context behind them. Furthermore, there is friction between the willingness to secure the organization with the business that wants to run forward.

FIG. 1 is a flowchart of a method of securing files and/or records according relevance to a specific process, in accordance with some embodiments of the invention.

At 110, the method discloses obtaining interaction data including one or more persons and one or more files and/or records. The interaction data may be collected as part of the process, or be provided to the entity performing the processes elaborated below from another entity, whose mission is to collect data about interactions between persons and/or files. The interaction data includes interaction events, such as participating in an online meeting, organizing the online meeting, accessing a calendar event, sending messages, receiving messages, reading a file, sharing a file, creating a file, editing a file, accessing a record, reading a record, sharing a record, creating a record, and editing a record. The messages may be email messages, SMS messages, messages over a business communication application such as Slack, Jira, and other software-based applications that enable transfer of messages between employees in an organization.

The interaction data may be an analysis product of the interaction events. For example, accumulate all the interaction events between users to assign a score to the connection between these two users. similarly, assign a value to an interaction between a user and a file or record based on the activity the use had with the file, such as reading the file, sending the file, editing the file, copying the file, renaming the file and the like.

The interaction data may include a process interaction score between a target user and the specific process. The process interaction score represents a unique relationship between a specific person and the specific process. The specific person may be an employee in the organization, a contractor, a client, a vendor and the like. The process interaction score may change over time, for example by computing the process interaction score once a week. For example, in case the specific person is no longer involved in the specific process, the process interaction score decreases. The process interaction score may be represented as a number. The methods, techniques and processes used to compute the process interaction score may vary over time, and are generally selected by a persons skilled in the art. The process interaction score may be computed using various metrics, for example number of interaction events, weights of interaction events, a value represented by a graph created by the interaction events, algorithms executed on graphs such as centrality score, PageRank and the like.

Optionally, the interaction events are normalized. The normalization is performed to enable aggregating different interaction events together, and/or to enable cross checking the different interaction events.

Optionally, the interaction events are pre-processed and/or normalized by combining data logs from different data sources. For example, from email addresses mentioned in logs obtained from different data sources, duplicates are removed.

The process interaction score between a specific user and a file and/or target record may be computed as a function of interaction scores between the target user and/or one or more other users having interaction weights with the specific process.

Interaction weights between the target user and the other users may be compared to a threshold. Interaction weights between the target user and the other users having values above the threshold may be considered to be significant for computing the process interaction score. Interaction weights between the target user and the other users having values below the social connection threshold may be ignored in the computation of the process interaction score.

Alternatively, or additionally, the process interaction score between the target user and the specific process may computed according to interaction weights between the target user and another file and/or another record, where the another file and/or another record have interaction weights with other user(s) known as related to the specific process.

At 120, the method discloses identifying, from the collected interaction data, one or more persons and one or more files and/or records related to a specific process. The identification may begin with a process and anchors known to be related to the process. The anchors may be persons or files that are clearly involved in the process. Then, the identifying includes identifying other persons who had relatively high interactions with the anchors, for example over messages or by editing the file known as related to the specific process. The outcome of this process is a list of persons and files/records related to the specific process.

The specific process may be a region of responsibility in an organization, for example accounting, marketing, patent filing, human resources, IT and the like. The specific process may be defined as a set of actions required to be performed by an organization in order to achieve a business goal, such as paying employees' salaries, verifying that all the organization's computers function sufficiently, preparing business contracts with clients and the like. For example, the anchors for the accounting process may be a CFO and other employees having finance in their job description.

At 125, the method discloses detecting a target user trying to perform an action on a file identified as related to the specific process. The action may include changing rules related to access/permission to the file. The action may be opening the file, editing the file, deleting the file, sending the file via a message, copying the file to another memory address and the like. The detection may be provided from an operating system controlling an operation of a device on which the file is stored, for example a server, a laptop, a data storage service such as AWS, google docs and the like.

At 130, the method discloses comparing a process threshold with a process interaction score between a target user and the specific process. The process threshold may vary from one process to another, for example according to the process importance or confidentiality level. The process threshold may vary over time, for example during patent litigation all the files related to patents require a higher threshold than in usual times in order for a person to access them.

At 140, the method discloses in response to the comparison satisfying a rule, performing a security operation on the message. Examples of security actions include

- Filtering security alerts and/or alert decluttering, for example DLP. The security alerts may be generated, for example, by a security monitoring process. Alerts that correspond to the target user and the target file and/or target record may be flagged with a flag indicating that the security alert is real. Alerts that do not correspond to the target user and target file and/or target record may be assumed to be false positives, and ignored. The number of false alerts may be significantly reduced.
- Access by the target user to the target file and/or target record may be automatically blocked, for example, by an IT application. For example, the access privileges of the target user are changed, the target user is kicked out of the current application running the target file and/or record, and a connection established by the target user to the target file and/or record is terminated.
- Risk may be reduced by identifying a unique kind of alert—actions without any context (e.g., business context) may be found as described herein, and therefore malicious actions by an insider or other malicious activity may be identified. These actions may be identified using available anomaly detection approaches.
- Security—IR (Incident Respond)—upon a security event, related actions and/or context (e.g., business context) may be provided (e.g., email, pop-up, notification, alert messages) to significantly reduce the TTR (time to respond).
- Information technology (IT)—Access request (authorization management)—upon a user's request to get access, whether the user has business justification may be determined as described herein, the context to approve may be provided to IT (e.g., to an administrator) for example, as an email, pop-up notification, push notification, alert, and the like.
- IT—least privilege access—when a user no longer has business justification for the access may be determined as described herein, and IT may be provided the context to remove permissions.

Figure 2:
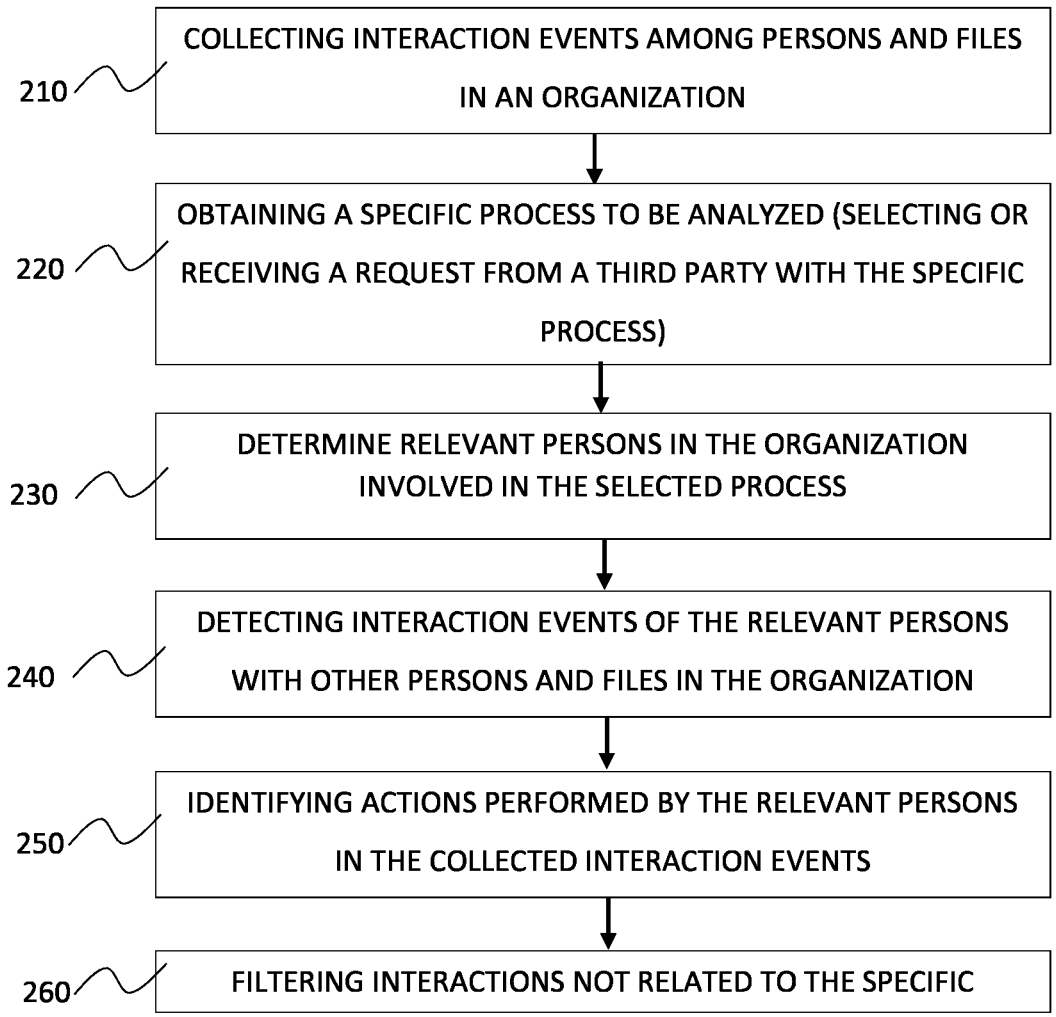
FIG. 2 is a flowchart of a method of creating the interaction data related to a specific process, in accordance with some embodiments of the invention.

FIG. 2 is a flowchart of a method of creating the interaction data related to a specific process, in accordance with some embodiments of the invention.

At 210, the method discloses collecting interaction events among persons and files in an organization. Interaction with files may relate to a user accessing the actual code of the file, for example, opening a file, reading a file, and editing a file. Interaction with records may relate to a user accessing an instance of data without necessarily accessing the code itself, for example, a user uses an online interface to search a database for a certain record.

The interaction events may be obtained from multiple data sensors and/or multiple interfaces (e.g., application programming interfaces (APIs)) that monitor user interactions, for example, monitor interactions over a network and/or within interaction applications.

Examples of interaction events include participating in an online meeting, organizing the online meeting, accessing a calendar event, sending messages, receiving messages, reading a file, sharing a file, creating a file, editing a file, accessing a record, reading a record, sharing a record, creating a record, and editing a record.

Examples of combinations (which may be used to create additional larger combinations) of data sources (e.g., APIs) from which interaction events may be obtained include (where each "email", "calendar" and other source represents one or more possible source such as different email applications by different vendors) Email+Calendar, Instance Messaging+Calendar, Email+Online Meeting, Instance Messaging+Online Meeting, Email+File sharing, Instance Messaging+File sharing, Calendar+File sharing, and Online Meeting+File sharing.

At 220, the method discloses obtaining a specific process to be analyzed (selecting or receiving a request from a third party with the specific process). The specific process may be a region of responsibility in an organization, for example accounting, marketing, patent filing, human resources, IT and the like. The specific process may be defined as a set of actions required to be performed by an organization in order to achieve a business goal, such as paying employees' salaries, verifying that all the organization's computers function sufficiently, preparing business contracts with clients and the like.

In some cases, the process is concluded from one or more persons, as the organization wishes to identify which process are related to a certain person, for example an employee, a contractor, a customer, a vendor and the like.

At 230, the method discloses determine relevant persons in the organization involved in the selected process. The relevant persons may be determined based on text extracted from job descriptions, or manually by persons that initiate the process. The relevant persons are the initial input for the system to process the collected interaction events for the specific process. This way, the files and persons are identified as related to the specific process based on interaction events of persons related to the specific process, not based on the files' content.

At 240, the method discloses detecting interaction events of the relevant persons with other persons and files in the organization. The detected interaction events are selected from the interaction events collected at step 210, for example from APIs and additional resources. The interaction events may be filtered according to rules, for example filter only interaction events of the relevant persons.

At 250, the method discloses identifying interaction events performed by the relevant persons in the collected interaction events. Identifying the actions may be performed by filtering the interaction events according to the persons' names. Not all the interaction events of the relevant persons are associated to the specific process. As such, at 260, the method discloses filtering out interactions not related to the specific process. Filtering may be done according to other persons involved in the same interaction event, for example in case an email message is sent from person A who is known as relevant to the specific process, to person B, who is known as relevant to the specific process, the email is likely to be related to the specific process. If the email includes a header which was found in other files related to the specific process, the interaction event receives a higher relevance score. Additional example for filtering may include a case in which an interaction event involves the entire organization or more than a threshold number of threshold percentage of the organization's employees. Filtering may be performed by various fields, such as user_id or email_account (instead of "user name", as there could be multiple users with the same name). filtering may relate to various items and types of items, such as messages, files, tasks and the like.

Figure 3:
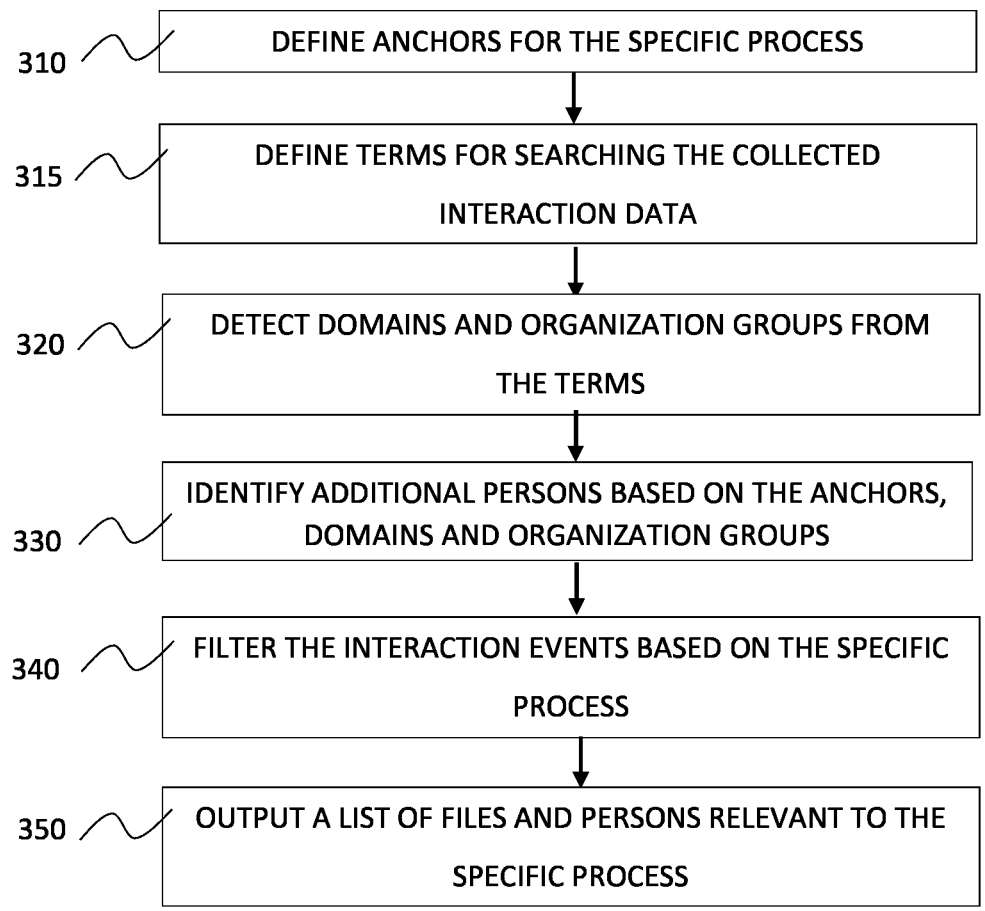
FIG. 3 is a flowchart of a method of refining the interaction data related to a specific process, in accordance with some embodiments of the invention.

FIG. 3 is a flowchart of a method of refining the interaction data related to a specific process, in accordance with some embodiments of the invention.

At 310, the method discloses defining anchors for the specific process. The anchors may be persons and/or files which are clearly related to the specific process. For example, in case the process is image processing, the anchors will be all the relevant technological people and the files that describe the algorithms. In case the process is marketing in Argentina, the anchors will be the head of marketing and documents having text in Spanish.

At 315, the method discloses defining terms for searching the collected interaction data. Searching may be done in the headers of the files, for example "subject" field of an email message, or also in the body, and in the attachments of the email. The terms may be inputted manually by a person that requests the searching process, or be selected automatically by a computer software, for example as terms which appear in a higher rate (for example, more times per 100 words) in the files already considered as relevant to the specific process.

At 320, the method discloses detecting domains and organization groups from the terms. The domains may represent email accounts or other messaging accounts related to persons outside the organization, such as @amazon.com, or in a specific geography, for example @co.uk, defining an address operating in the United Kingdom. The organization groups may be teams, departments, divisions and the like, for example in the fields of marketing, R&D, legal, finance, Human Resources, sales, technical support and the like.

At 330, the method discloses identifying additional persons based on the anchors, domains and organization groups. The additional persons are also related to the specific process. The additional persons have interaction events with the anchors, such as meetings, exchange of messages, editing and accessing files relevant to the specific process and the like. For example, in case an organization has 180 employees, employees #3, #62 and #115 are defined as anchors, and employees #1, #14, #150 and #78 are identified as additional persons relevant to the specific process based on the interaction data. For example, employees #14 and #150 may be part of the same group as employee #62, who leads the specific process.

At 340, the method discloses filtering the interaction events based on the specific process. This process leaves only the interaction events related to the specific process, filtering out the other interaction events. In some cases, the interaction events are assigned a score, and only events having a score higher than or lower than a threshold are filtered.

At 350, the method discloses outputting a list of files and persons relevant to the specific process. Outputting may be provided by displaying the list on a display device, by sending the list to a messaging account such as email or another business communication application. Outputting may be done by uploading the list to a web page or to a server.

Figure 4:
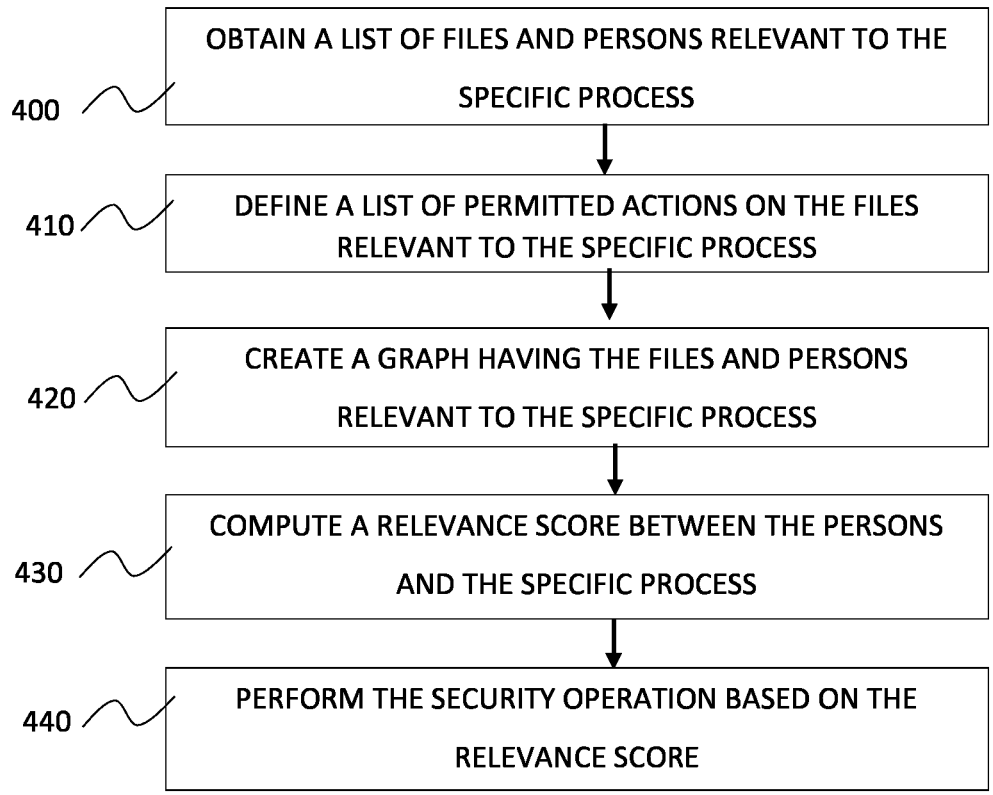
FIG. 4 is a flowchart of a method of performing actions on the refined interaction data related to a specific process, in accordance with some embodiments of the invention, FIG. 5, which is a block diagram of a system of securing files and/or records according to relevance of a specific person to a specific process, in accordance with some embodiments of the invention.

FIG. 4 is a flowchart of a method of performing actions on the refined interaction data related to a specific process, in accordance with some embodiments of the invention.

At 400, the method discloses obtaining a list of files and persons relevant to the specific process. The list may be provided from the processes disclosed above, of identifying the persons and files relevant to the specific process. The number of files and persons relevant to the specific process may vary over time, and may vary from one process to another. The list may be stored in a memory address of an electronic device, for example a server, a database, in a cloud storage service and the like.

At 410, the method discloses define a list of permitted actions on the files relevant to the specific process. The list may include accessing the files, but not editing the files. The list may change according to a relevance score of different persons related to the specific process. For example, 30% of the persons having higher relevance score are permitted to edit files relevant to the specific process, while the other persons relevant to the specific process can only view the files, while other employees in the organization are not permitted to view the files or perform any action on the files relevant to the specific process. The list of actions permitted to persons may vary between processes, for example based on process importance or confidentiality.

At 420, the method discloses create a graph having the files and persons relevant to the specific process. The graph may include nodes representing the files and persons, and edges representing the links between the files and persons according to interaction events. The files and persons may be linked to more than one other node in the graph. At least one of the edges in the graph may have a weight indicating the significance of the interaction events between the two nodes connected by the edge.

At 430, the method discloses compute a process interaction score between the persons and the specific process.

The computation of the process interaction score may be performed in response to monitoring an attempt of the target user to perform an action on the target file. The process interaction scores may be stored in memory addresses of electronic devices and used in response to monitoring such attempt. The process interaction score may change over time, for example according to the time elapsing since the last interaction events of the person and the specific process.

At 440, the method discloses perform the security operation based on the process interaction score. The examples of such security operation are provided above relating to step 140.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The invention may be a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The context (e.g., explanation) may include one or more of
Other user(s) connected to the target user.
The interaction weights between the target user and the other user(s).
The other file and/or other record.
The interaction weights between the target user and the other file and/or other record.
One or more interaction type category of the interaction between the target user and the other users.
One or more interaction type category of the interaction between the target user and the other file and/or other record.
A time from an interaction of the target user with the target file and/or target record to a current time of the attempted access.
A time from an interaction of the target user with other users that interacted with the target file and/or target record to the current time of the attempted access.
A time from an interaction of the target user with the target file and/or target record to a time from an interaction of the target user with other users that interacted with the target file and/or target record.

Figure 5:
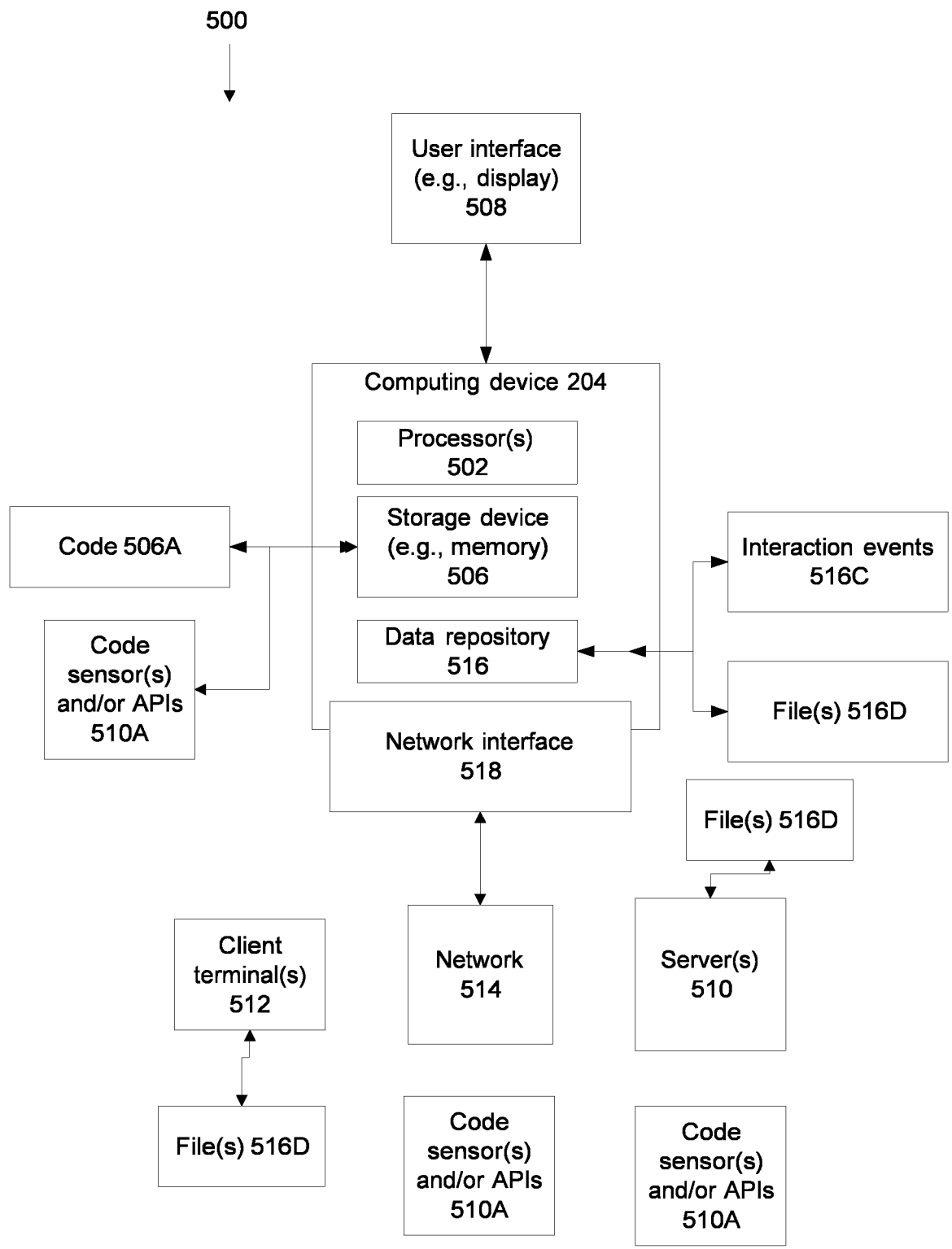

Reference is also made to FIG. 5, which is a block diagram of a system of securing files and/or records according to relevance of a specific person to a specific process, in accordance with some embodiments of the invention.

System 500 may implement the acts of the method described above, by processor(s) 502 of a computing device 504 executing code instructions 506A stored in a storage device 506 (also referred to as a memory and/or program store).

Computing device 504 may be implemented as, for example one or more and/or combination of a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 500 based on computing device 504 may be implemented. In an exemplary implementation, computing device 504 storing code 506A may be implemented as one or more servers (e.g., network server, web server, a computing cloud, a virtual server) that provides centralized services (e.g., one or more of the acts described above) to one or more client terminals 512 and/or server(s) 510 over a network 514, for example, providing software as a service (SaaS) to the client terminal(s) 512 and/or server(s) 510, providing software services accessible using a software interface (e.g., application programming interface (API), software development kit (SDK)), providing an application for local download to the client terminal(s) 512 and/or server(s) 510, and/or providing functions using a remote access session to the client terminals 512 and/or server(s) 510, such as through a web browser. For example, computing device 504 centrally monitors interactions between multiple users that use their respective client terminals 512 to access file(s) 516D stored on different locations, for example, on client terminal(s) 512 of the same and/or different users, on server(s) 510, and/or on computing device 504. Computing device may blocks access by specific users to specific file(s) 516D and/or centrally grants access to specific users to access specific file(s) 516D.

In another exemplary implementation, computing device 504 provides local and/or non-centralized services to users of computing device 504. Computing device 504 may include locally stored software (e.g., code 506A) that performs one or more of the acts described herein, for example, as a self-contained client terminal that is designed to be used by users of the client terminal. In such implementation, computing device 504 grants access and/or denies access to file(s) 516D which may be locally stored on computing device 504 to users that use computing device 504.

The interaction events may be stored in an interaction event repository 516C. Interaction events may be collected, for example, by code sensor(s) and/or application programming interfaces (APIs) and/or other virtual interfaces, which may be installed, for example, on computing device 504, on a network 514, on server(s) 510, on client terminal(s) 512, and on other devices and/or applications.

Processor(s) 502 of computing device 504 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 502 may include a single processor, or multiple processors (homogenous or heterogeneous) arranged for parallel processing, as clusters and/or as one or more multi core processing devices.

Data storage device 506 stores code instructions executable by processor(s) 502, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 506 stores code 506A that implements one or more features and/or acts of the method described herein when executed by processor(s) 502.

Computing device 504 may include a data repository 516 for storing data, for example one or more of interaction event repository 516C, and/or files 516D. Data repository 516 may be implemented as, for example, a memory, a local hard-drive, virtual storage, a removable storage unit, an optical disk, a storage device, and/or as a remote server and/or computing cloud (e.g., accessed using a network connection).

Network 514 may be implemented as, for example, the internet, a local area network, a virtual private network, a wireless network, a cellular network, a local bus, a point to point link (e.g., wired), and/or combinations of the aforementioned.

Computing device 504 may include a network interface 518 for connecting to network 514, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 504 may connect using network 514 (or another communication channel, such as through a direct link (e.g., cable, wireless) and/or indirect link (e.g., via an intermediary computing unit such as a server, and/or via a storage device) with one or more of Server(s) 510 which store file(s) 516D that are accessed by users and/or which store code sensor(s) and/or API 510A which monitor interaction events.

Client terminal(s) 512, which may be used by users accessing file(s) 516D (e.g., stored at different locations), and/or which may include code sensor(s) and/or API 510A which monitor interaction events.

Computing device 504 and/or client terminal(s) 512 include and/or are in communication with one or more physical user interfaces 508 that include a mechanism for a user to enter data and/or view data (e.g., read and/or edit files, interact with other users). Exemplary user interfaces 508 include, for example, one or more of, a touchscreen, a display, a keyboard, a mouse, and voice activated software using speakers and microphone.

In another example, justification to access the target file may be provided to internal users that use personal emails to access files. This action, even though it has the potential of being risky, can be legitimate, and should be identified separately than any other access by a personal user.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant files and/or records will be developed and the scope of the term file and/or record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of the invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the invention. To the extent that section headings are used, they should not be construed as necessarily limiting. In addition, any priority document(s) of this application is/are hereby incorporated herein by reference in its/their entirety.

What is claimed is:

1. A computer implemented method for securing at least one of files and records related to a specific process, the method comprising:
    obtaining interaction data comprising interaction events occurring between multiple persons and multiple files and/or records;
    identifying regions of responsibility in the organization from the interaction events;
    computing multiple process interaction scores for multiple persons, each process interaction score of the multiple process interaction scores represents a relevance of a person of the multiple persons to multiple regions of responsibility in an organization;
    wherein the multiple process interaction scores that represent the relevance of the person to multiple regions of responsibility in an organization are computed based on the interaction events;
    detecting a target user of the multiple persons requesting access to a target file or target record selected from the multiple files and/or records;
    identifying the target file or target record as being related to a specific region of responsibility in the organization of the multiple regions of responsibility in the organization;
    computing a process interaction score between the target user and the specific region of responsibility in the organization according to interaction events between the target user and at least one other user identified as related to the specific region of responsibility in the organization;
    (1) measuring a first time from an interaction of the target user with the target file and/or target record to a current time of the attempted access;
    (2) measuring a second time from an interaction of the target user with other users that interacted with a file or record associated with the specific process to the current time of the attempted access;
    (3) measuring a third time from an interaction of the target user with the target file and/or target record to a time from an interaction of the target user with other users that are associated with to the specific process;
    wherein the process interaction score changes over time according to the first time, the second time and the third time;
    comparing a process threshold with a process interaction score of the target user representing a unique relationship between a target user and the specific region of responsibility in the organization; and
    in response to the comparison satisfying a rule, performing a security operation on the one or more files and/or records related to the specific region of responsibility in the organization, wherein the security operation comprises changing permission definitions for the target user.

2. The method of claim 1, further comprising monitoring an attempt by the target user to access one or more files and/or records related to the specific process.

3. The method of claim 1, further comprising updating the interaction data with new interactions.

4. The method of claim 1, further comprising computing a risk level score according to a difference between the process interaction score and the process threshold.

5. The method of claim 1, further comprising:
    collecting a plurality of interaction events between entities known as related to the specific process;
    computing the interaction data according to an analysis of the plurality of interaction events.

6. The method of claim 5, wherein collecting the plurality of interaction events is performed using at least one of a group comprising a code sensor, an application programming interfaces (APIs) and a virtual interface, installed on a device operated by the users.

7. The method of claim 5, wherein the interaction events are associated with an interaction contribution date, wherein a weight at least some of the interaction events decreases over time.

8. The method of claim 5, wherein the plurality of interaction events is selected from a group consisting of: participating in an online meeting, organizing the online meeting, accessing a calendar event, sending email messages, receiving email messages, reading a file, sharing a file, creating a file, editing a file, accessing a record, reading a record, sharing a record, creating a record, and editing a record.

9. The method of claim 1, wherein the security operation comprises delaying access from the target user to at least one of the one or more files and/or records identified as related to the specific process.

10. The method of claim 1, wherein the security operation comprises filtering an alert.

11. The method of claim 1, further comprising identifying relevant persons in the organization that are relevant to the specific region of responsibility in the organization.

12. The method of claim 1, wherein computing the process interaction score of the target user further comprises comparing interaction weights between the target user and relevant persons in the organization that are relevant to the specific region of responsibility in the organization to a threshold, wherein the interaction weights indicate a significance of the interaction events.

13. The method of claim 1, wherein defining the target file or target record as being related to the specific region of responsibility comprises identifying interaction events between the target file or target record and at least one other user identified as related to the specific region of responsibility in the organization.

* * * * *